(12) United States Patent
Bottou et al.

(10) Patent No.: US 7,657,103 B2
(45) Date of Patent: *Feb. 2, 2010

(54) METHOD AND SYSTEM FOR CLASSIFYING IMAGE ELEMENTS

(75) Inventors: Leon Bottou, Highlands, NJ (US); Patrick Guy Haffner, Atlantic Highlands, NJ (US)

(73) Assignee: AT&T Intellectual Property II, LP, New York, NY (US)

( * ) Notice: Subject to any disclaimer, the term of this patent is extended or adjusted under 35 U.S.C. 154(b) by 686 days.

This patent is subject to a terminal disclaimer.

(21) Appl. No.: 11/140,218

(22) Filed: May 27, 2005

(65) Prior Publication Data
US 2005/0207666 A1 Sep. 22, 2005

Related U.S. Application Data

(63) Continuation of application No. 10/057,687, filed on Jan. 24, 2002, now Pat. No. 6,901,169.

(60) Provisional application No. 60/265,544, filed on Feb. 1, 2001.

(51) Int. Cl.
*G06K 9/62* (2006.01)
(52) U.S. Cl. .................. 382/224; 382/203; 382/243; 382/286
(58) Field of Classification Search .............. 382/181, 382/190, 203, 224, 232, 243, 286, 164, 165, 382/173, 280
See application file for complete search history.

(56) References Cited

U.S. PATENT DOCUMENTS

| 5,335,290 | A | 8/1994 | Cullen et al. |
| 5,900,953 | A | 5/1999 | Bottou et al. |
| 6,263,091 | B1 | 7/2001 | Jain et al. |
| 6,731,800 | B1 * | 5/2004 | Barthel et al. ............... 382/176 |
| 6,738,154 | B1 * | 5/2004 | Venable ..................... 358/1.15 |
| 6,738,424 | B1 * | 5/2004 | Allmen et al. ......... 375/240.08 |

FOREIGN PATENT DOCUMENTS

| JP | 11213156 A | 8/1999 |
| JP | 11312234 A | 11/1999 |
| JP | 2000050259 | 2/2000 |
| WO | 0077735 A1 | 12/2000 |

OTHER PUBLICATIONS

Bottou et al, "High Quality Document Image Compression with DjVu", *Journal of Electronic Imaging*, vol. 7, No. 3, Jul. 1998, pp. 410-425.
Bottou et al, "Lossy Compression of Partially Masked Still Images", Proceedings DCC '98, Data Compression Conference, Snowbird, Utah, IEEE Computer Society Technical Comm. on Computer Communications, Mar. 30-Apr. 1, 1998, p. 28.

(Continued)

*Primary Examiner*—Phuoc Tran

(57) ABSTRACT

A method, system, and machine-readable medium for classifying an image element as one of a plurality of categories, including assigning the image element based on a ratio between an unoccluded perimeter of the image element and an occluded perimeter of the image element and coding the image element according to a coding scheme associated with the category to which the image element is classified. Exemplary applications include image compression, where categories include image foreground and background layers.

25 Claims, 9 Drawing Sheets

OTHER PUBLICATIONS

Haffner et al, "DjVu: Analyzing and Compressing Scanned Documents for Internet Distribution", ICDAR '99, IEEE Computer Society, Bangalore, India, Sep. 20-22, 1999, pp. 625-628.

Mixed Raster Content (MRC), Series T: Terminals for Telematic Services, International Telecommunication Union, ITU-T, Telecommunication Standardization Sector of ITU, T.44, Apr. 1999.

Bottou et al, "Efficient Conversion of Digital Documents to Multilayer Raster Formats", Proceedings of the Sixth International Conference on Document Analysis and Recognition, Sponsored by IAPR, Seattle, Washington, Sep. 10-13, 2001, pp. 444-448.

Haffner et al., "Browsing through High Quality Document Images with DjVU," Proc. IEEE International Forum on Research and Technology Advances in Digital Libraries, Apr. 22, 1998, pp. 309-318.

Ozer et al., "A Graph Based Object Description for Information Retrieval in Digital Image and Video Libraries," Proc. IEEE Workshop on Content-Based Access of Image and Video Libraries, 1999, pp. 79-83.

Bottou et al., "High quality document image compression with 'DjVU'", Journal of Electronic Imaging, vol. 7, No. 3, Jul. 1, 1998, pp. 410-425.

* cited by examiner

METHOD AND SYSTEM FOR CLASSIFYING IMAGE ELEMENTS

REFERENCE TO RELATED DOCUMENTS

The present application claims priority to U.S. patent application Ser. No.,10/057,687, filed on Jan. 24, 2002, now U.S. Pat. No. 6,901,169, which claims priority under 356 U.S.C. §119(e) to U.S. provisional application Ser. No. 60/265,544, filed on Feb. 1, 2001, the entire contents of which are incorporated herein by reference.

TECHNICAL FIELD

The present invention relates generally to image processing and, more particularly, to methods, systems, and machine-readable media for classifying image elements.

BACKGROUND OF THE INVENTION

Many images are produced using computerized methods that do not rely on a pixel-based representation of an image. Text processing software, for instance, represents an image using structured page information that describes high-level elements of the image, such as text, fonts, colors, embedded images, etc. This structured page information comes in a large variety of file formats such as MSWord™ doc, Adobe™ PDF, or PostScript™ files. When printed or otherwise rendered, the information may be converted into a sequence of overlaid image elements that incrementally construct the image.

There is often a need to compress, i.e., encode, these images. Generally, the image elements are first classified as either foreground or background based on some classification criteria. After classification, the foreground is encoded at a higher resolution because it contains the elements of interest. The background, on the other hand, is typically encoded at a lower resolution since it contains elements of less interest. Such a coding strategy is well known in the art, e.g. in MPEG, JPEG, etc. Thus, the quality of the element classification greatly affects the compression ratio and video quality of these images. As such, it is important to perform the classification effectively.

Current element classification approaches for images rendered from structured page information include classifying all the text in the image as the foreground and all other details as the background, classifying all the monochrome elements as the foreground and all others as the background, and classifying the first element drawn as the background and all others as the foreground. However, all of these approaches are ineffective, particularly for geographical maps, because the elements of interest are sometimes rendered such that they meet the criteria for background classification when, in fact, they are foreground elements. As a result, these elements of interest are erroneously encoded at a lower resolution. As such, the compression efficiency and video quality of these elements significantly drop.

Accordingly, there is a need in the art for an effective way to classify image elements, in general, and image elements rendered from structured page information, e.g., electronic documents, in particular.

SUMMARY OF THE INVENTION

The present invention provides a method for classifying an image element as one of a plurality of categories. The method includes classifying the image element based on a ratio between an unoccluded perimeter of the image element and a perimeter of the image element having been occluded by other image elements. The image element thereafter may be coded according to a coding scheme associated with the category to which the image element has been classified.

DETAILED DESCRIPTION

Embodiments of the present invention provide a technique for classifying image elements as one of a plurality of categories based on a ratio between an unoccluded perimeter of the element and an occluded perimeter of the element. The occluded perimeter of an image element typically differs from the unoccluded perimeter of the element when other image elements are overlaid upon it. Thus, the ratio can provide a good estimate of an amount to which an image element is blocked by other image elements. "Pushing" coding errors to highly occluded image elements can effectively improve perceived quality of a highly compressed image.

Figure 1A:
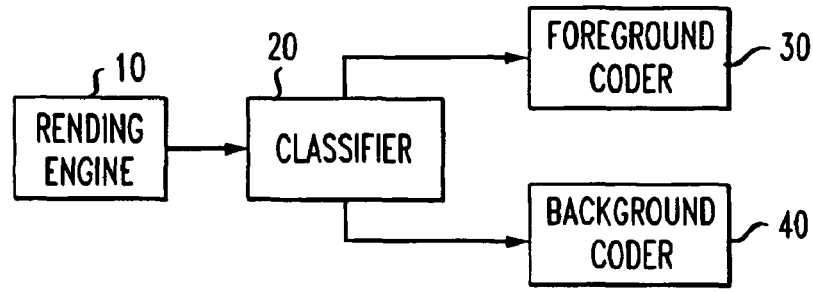
FIG. 1A is a block diagram of a system embodying the present invention.

The present invention may be applied to image compression, where image elements may be classified as belonging to one of foreground and background layers. FIG. 1A is a block diagram of an image compression system embodying the present invention. The system includes a rendering engine 10, a classifier 20, a foreground coder 30, and a background coder 40. The rendering engine 10 generates the image to be compressed. The rendering engine 10 can be, but is not limited to, a print driver or text processing software. The classifier 20 processes the image by classifying its image elements as either foreground or background elements. The elements classified as foreground may be coded according to any coding technique by the foreground coder 30. Similarly, the elements classified as background may be coded according to any coding technique by the background coder 40. Exemplary coding techniques are well known in the art. Such techniques may be used independently or in conjunction with coding techniques described in "High Quality Document Image Compression with DjVu", by L. Bottou, et.al., *Journal of Electronic Imaging*, 7(3): 410-425, 1998, for example. Typically, the foreground and background coding techniques will be selected to provide compression of the foreground image elements with low loss of image quality. Whereas, the background image elements will be coded with higher compression and relatively higher loss of image quality.

It is to be understood that the image compression application is for exemplary purposes only, as the present invention may also be used in any application where image element classification is performed. It is to be further understood that the number of categories is not limited to two.

In exemplary image compression, a low ratio between unoccluded and occluded perimeters of an image element may indicate that if the element were classified as belonging to the background layer, any coding errors with respect to the element's boundaries are likely to be obscured by other occluding elements from the foreground layer. Thus, the coding errors are unlikely to be noticed. By contrast, a high ratio between unoccluded and occluded perimeters of the image element may indicate that coding errors with respect to the boundaries are likely to be observed because they will not be obscured by other elements. In this event, it may be appropriate to code the element in the foreground layer. Thus, the present invention provides a higher compression ratio and improved visual quality of compressed images.

The number of bits for encoding foreground elements may be proportional to the perimeter $P_{occluded}$ of the visible part of the element (i.e., after removing the element shape portions that are occluded by other elements). The edges of background elements that arise from occlusions by foreground elements may be defined by the boundary of the occluding foreground elements. So, the number of bits for encoding background elements may be reduced by excluding the occluded parts of the background elements, which may be already encoded as part of the foreground elements. Thus, the number of bits for encoding background elements may be proportional to the length $P_{unoccluded}$ of the perimeter segments that do not result from occlusions by foreground elements. Furthermore, the proportionality coefficient depends on the color differences along the element boundary.

Figure 1B:
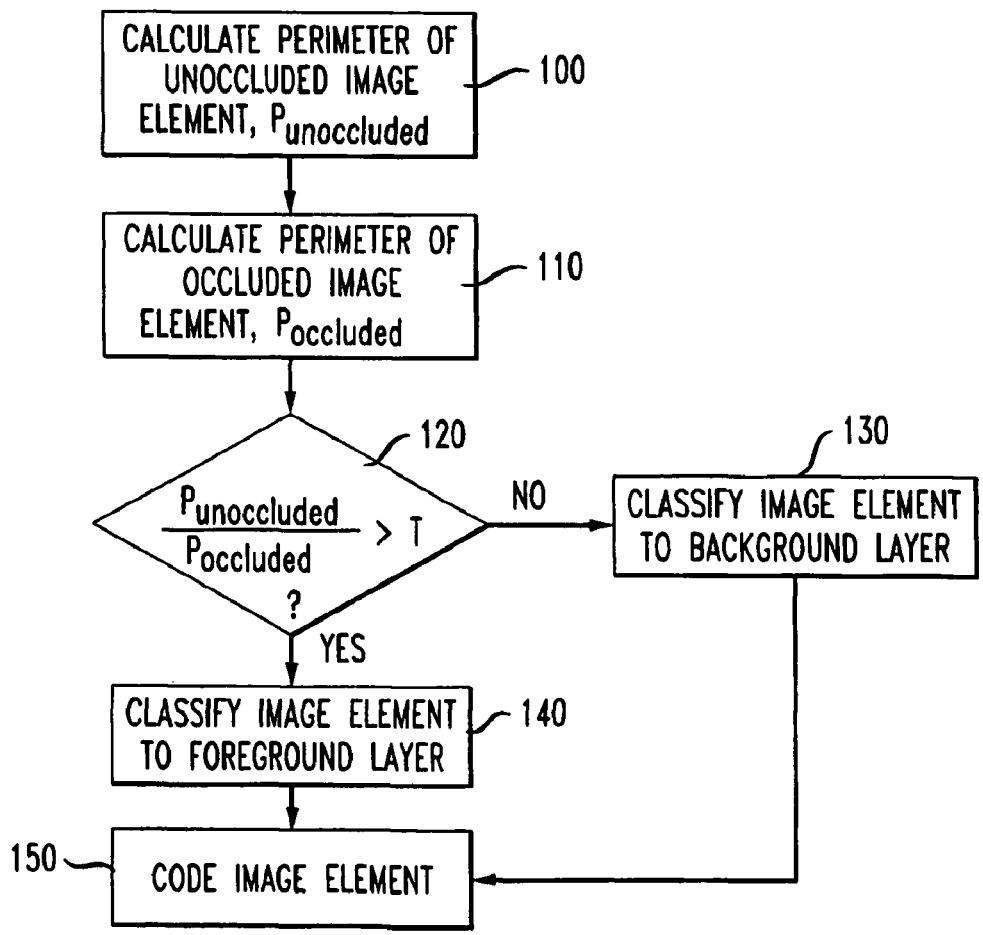
FIG. 1B is a flowchart of an embodiment of a method of the present invention.

FIG. 1B is a flowchart of a method according to an embodiment of the present invention. According to the invention, an image classification system calculates an unoccluded perimeter of an image element, $P_{unoccluded}$, (100) and a perimeter of the image element when occluded by other image elements, $P_{occluded}$ (110). The system compares a ratio of these calculated values to a predetermined threshold T(120):

$$\frac{P_{unoccluded}}{P_{occluded}} > T. \tag{1}$$

If the ratio of $P_{unoccluded}$ to $P_{occluded}$ exceeds the threshold, then the system classifies the image element as belonging to the foreground layer (140). Otherwise, the system classifies the image element as belonging to the background layer (130). An exemplary threshold T is 80%. The system then codes the image element using either a foreground or background coding scheme based on the element classification (150).

Optionally, the system assigns some predetermined types of image elements to either the foreground or background layer. For example, the system may pre-assign text and symbols to the foreground layer. Since the foreground may be encoded with higher resolution, encoding text and symbols as foreground improves their readability.

It is to be understood that all or portions of the present invention may be used in connection with other methods for classifying image elements, as some aspects may be optional. For example, if text may be automatically assigned to the foreground layer, the method need not be applied to textual image elements.

An image element processed according to the present invention may be initially represented as structured page information which describes the components of the image element and its coordinates in an image. Most of these components are simple operations such as "fill a rectangle," "draw a line," or "draw a piece of text." These operations simply assign a solid color to a set of specified portions called the element shape. Later operations may overwrite image data generated by earlier operations. When the printing operations are completed, they render a complete printed output (often a page).

In the present invention, the system processes the image element from its structured page information, such that the image element coordinates are read and compared to foreground and background layers. From this comparison, the system determines the occluded portions of the image element. Then, the system renders the image element into either the foreground or background layers.

Figure 2:
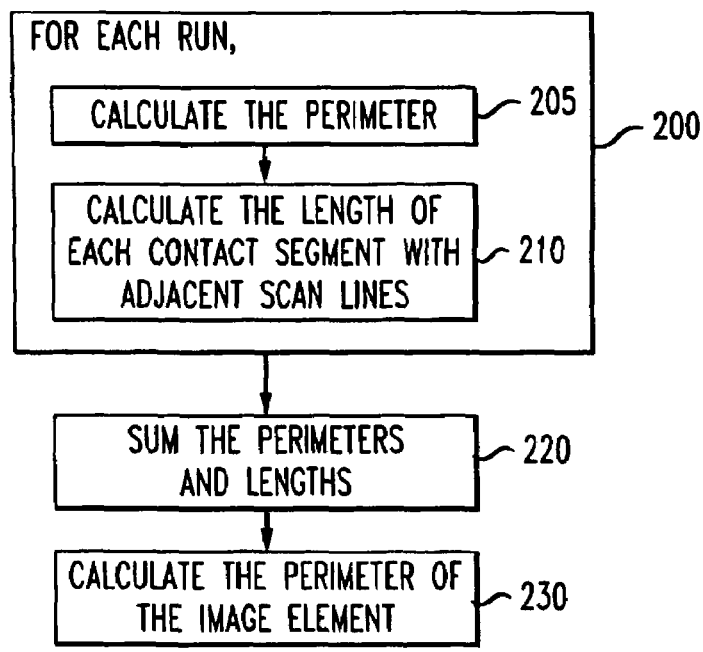
FIG. 2 is a flowchart of exemplary steps for calculating an image element perimeter.

FIG. 2 is a flowchart of an exemplary method for calculating the image element perimeter. The method makes a number of Boolean operations between the foreground and background layers and the image element shapes. In this embodiment, these layers and shapes may be represented using run-length encoding. In run-length encoding, each scan line (or row) of the layers and image elements is represented by a sequence of lengths that describe successive runs of black and white bits. A run is a contiguous group of 0's (white bits) or 1's (black bits) encountered in a left to right scan of the scan line. For exemplary purposes, the black bits represent image elements and the white bits represent non-element space. Accordingly, the system calculates the perimeter of a run-length-encoded layer or element shape by making a single pass on the "black bit" runs, scanning each scan line of the layer or element shape from left to right (200).

For each "black bit" run, the system calculates the run's perimeter r by adding twice the length of the run, i.e., the number of bits, and twice the width (205). The values of the length and width are doubled to account for, respectively, the top and bottom lengths and the end widths. Then, the system calculates the length l of each contact segment between the run and the adjacent run in the next scan line, i.e., the run bits in the next scan line that are adjacent to the run and are part of the same layer or element shape (210).

After processing all the runs, the system sums all the perimeters r to produce R and all the contact lengths l to produce L (220). Since perimeters of adjacent runs include the same contact length, the system multiplies the sum L by two to account for the duplicate inclusion. The system calculates the perimeter of the layer or element shape as P=R−2L (230).

Figure 3:
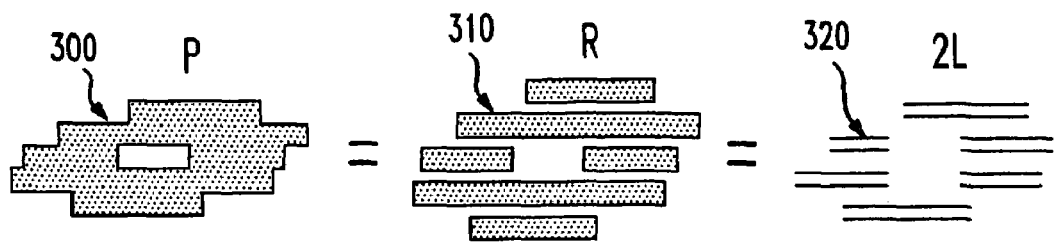
FIG. 3 illustrates an exemplary perimeter calculated according to the method of FIG. 2.

FIG. 3 illustrates the perimeter calculation in FIG. 2 for an exemplary image element. In this example, the image element 300 is made up of 5 scan lines. Each scan line has a single "black bit" run, with the exception of the third scan line, which has two, separated by a "white bit" run. The system determines the perimeter r of each "black bit" run 310. Then, the system computes the sum R of the perimeters r of the runs 310. The system detects the contact segments 320 between adjacent runs, sums all their lengths l, and multiplies the sum by 2 to produce 2L. The perimeter P of the image element 300 equals R−2L.

It is to be understood that the perimeter calculation is for exemplary purposes only, as the perimeter calculated by other techniques may also be used by the present invention. Such techniques include, but are not limited to, contour-mapping and region-growing.

Figure 4:
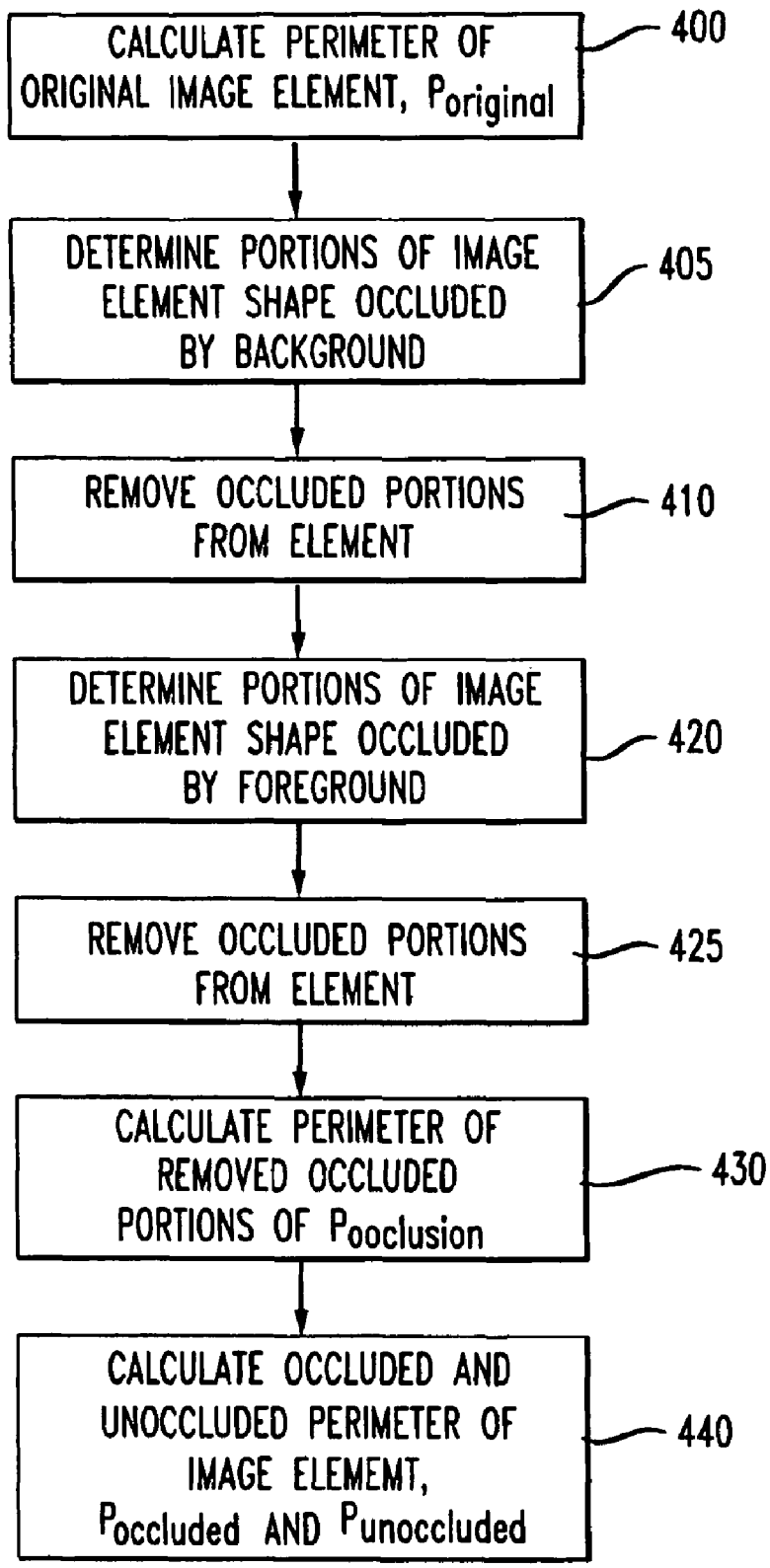
FIG. 4 is a flowchart of exemplary steps for calculating an occluded and unoccluded perimeter.

FIG. 4 illustrates an exemplary method for detecting the unoccluded and occluded portions of the image elements for which the system calculates perimeters using the method of FIG. 2, for example, such that the image element may be classified as belonging to either foreground or background layers. First, the system creates two empty layers F and B to represent the image elements to be classified as foreground and background. The system then performs the following on every image element starting from the topmost element and proceeding toward the bottommost element.

The system calculates the perimeter $P_{original}$ of the image element (400). This is the perimeter of the original shape of the image element as it would appear without occlusion. Then, the system determines the portions of the image element shape occluded by background image elements drawn above the current image element (405). This is achieved by calculating the intersection of the image element shape and the current background B. For example, for a given image element portion i, if the current background portion B(i) has a value, then the image element portion i is designated as occluded and removed.

For the first image element processed, i.e. the topmost element, the background B is empty, such that there are no occluded portions to remove. For subsequent elements, if the background includes previously processed occluding elements, the system removes the occluded portions from the image element shape (410).

Next, the system determines the portions of the resulting element shape occluded by foreground image elements drawn above the current image element (420). This is achieved by calculating the intersection of the image element shape and the current foreground F. For example, for a given image element portion i, if the current foreground portion F(i) has a value, then the image element portion i is designated as occluded and removed.

For the first image element processed, i.e., the topmost element, the foreground F is empty, such that there are no occluded portions to remove. For subsequent elements, if the foreground includes previously processed occluding elements, the system removes the occluded portions from the image element shape (425). The system then calculates the perimeter $P_{occlusion}$ of the portions occluded by foreground and background elements (430).

The resultant image element shape includes only the visible portions of the image element. The system now calculates the occluded perimeter $P_{occluded}$ of the element and the unoccluded perimeter $P_{unoccluded}$ of the element (440), where $$P_{occluded} = R - 2L, \quad (2)$$

the perimeter of the visible portions, as described previously. And, $$P_{unoccluded} = \frac{P_{original} + P_{occluded} - P_{occlusion}}{2}, \quad (3)$$

the perimeter of the visible boundary, where the sum of the occluded and original perimeters is equal to twice the unoccluded perimeter of the image element plus the perimeter of the occluded portions that are removed.

Figure 5A:
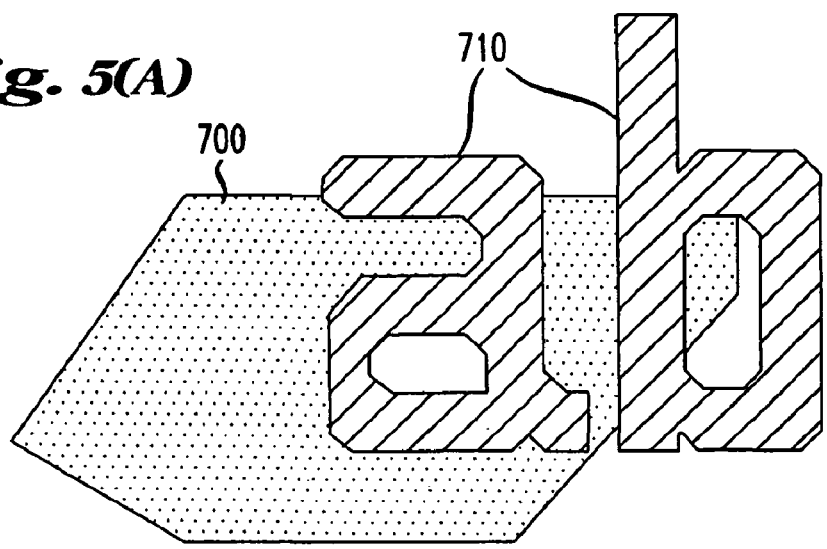
FIGS. 5A-5C illustrate exemplary occluded and unoccluded perimeters calculated according to the method of FIG. 4.
Figure 5B:
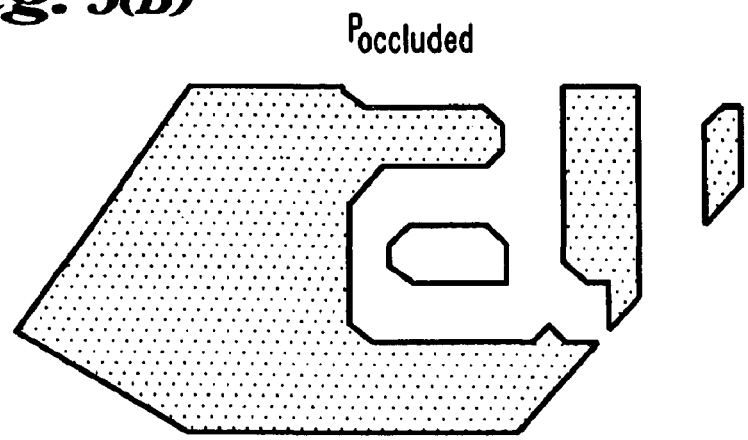
Figure 5C:
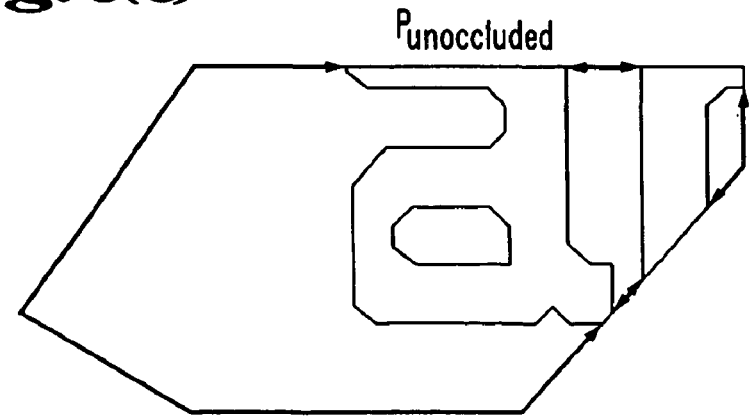

FIGS. 5A-5C illustrate exemplary occluded and unoccluded portions of an image element detected according to a method of the present invention. FIG. 5A illustrates a polygonal image element 700 which is occluded by 'ab' image element 710. The occluded perimeter $P_{occluded}$ of the polygon 700, i.e., the perimeter of the visible portions with the occluded portions removed, is shown in FIG. 5B. The unoccluded perimeter $P_{unoccluded}$ of the polygon 700, i.e., the discontinuous visible boundaries (indicated by thick black lines), is shown in FIG. 5C.

Figure 6:
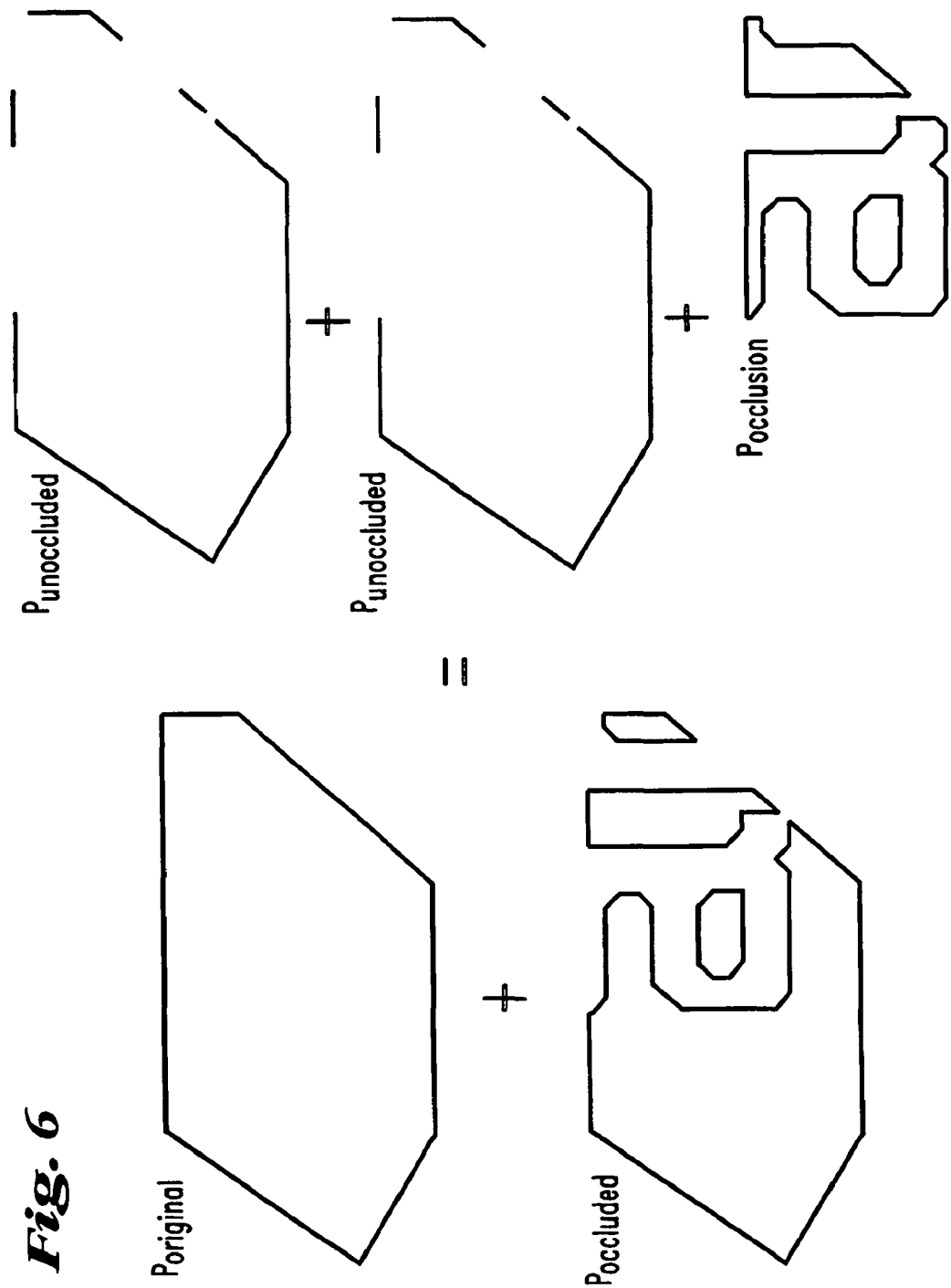
FIG. 6 illustrates the unoccluded perimeter calculation.

FIG. 6 illustrates the calculation from Equation (3) used to determine the unoccluded perimeter of the polygon 700. The sum of the original and occluded perimeters, $P_{original}$ and $P_{occluded}$, is equal to twice the unoccluded perimeter $P_{unoccluded}$ plus the perimeter of the occluded portions $P_{occlusion}$.

It is to be understood that the method for detecting unoccluded and occluded portions of the image elements is for exemplary purposes only, as many variations of this method may be used by the present invention.

Optionally, a color difference δ may be included in the ratio, $$\frac{\delta P_{unoccluded}}{P_{occluded}} > T. \quad (4)$$

The color difference may be used to determine how closely the color of an image element matches that of the background. If the colors are closely matched, then the edges of the image element are not very distinct, such that the likelihood of the element belonging to the background is high.

Generally, multiple passes over an image element are used to determine whether the element belongs in the foreground or background. This is done because elements located below the current element may turn out to be foreground elements, rather than background elements, and may thus affect the perimeter of the current element. In the present invention, the calculation of the color difference allows an estimate of the likelihood of the current element being assigned to background, thus enabling a single pass over an image element to determine whether it should be foreground or background.

Figure 7A:
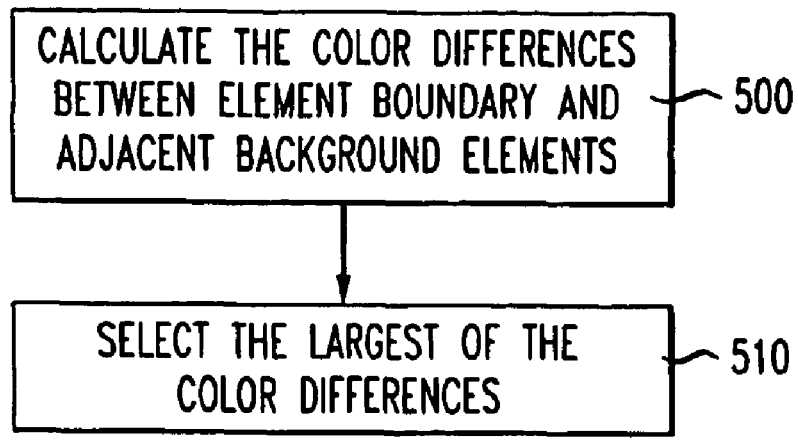
FIGS. 7A and 7B are flowcharts of exemplary steps for calculating a color difference of an image element.

Since the computation of the color difference may be very expensive, two exemplary simplifications may be used. FIG. 7A is a flowchart of a first example. The system calculates the color difference between the element boundary and each of the adjacent background elements (500). Then, the system selects the largest of these color differences as δ (510).

Figure 7B:
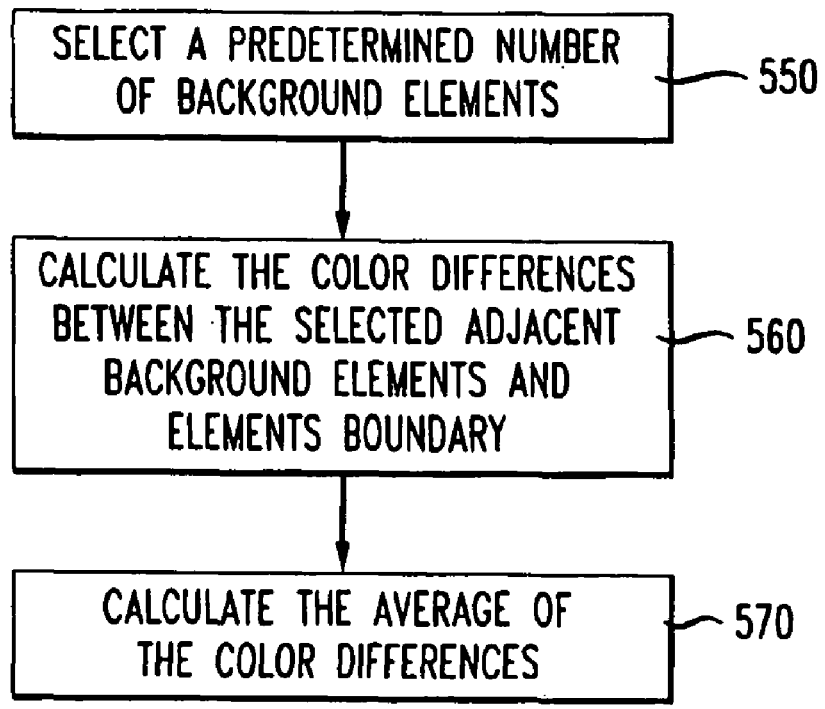

FIG. 7B illustrates a second example. The system selects a predetermined number of background elements (550). The system heuristically determines these background elements during a preliminary pass over the image elements according to the background elements' overall size and form. That is, an image element, such as a solid rectangle, with a large area compared to its bounding box (i.e., an imaginary boundary around the element) and a large area overlapping with the current image element is a potential background element. As such, the image element may be used to calculate the color difference. Conversely, an image element, such as a long thin curve, with a small area compared to its bounding box and a small area overlapping with the current image element is not a potential background element. As such, the image element may not be used to calculate the color difference.

After the system selects the background elements, the system calculates the color difference between each of the selected adjacent background elements and the element boundary (560). The system then averages the color differences as δ (570).

It is to be understood that the methods described for calculating color difference are for exemplary purposes only, as many techniques to calculate color difference may be used in the present invention. Such techniques include, but are not limited to, gradient measurements.

Figure 8:
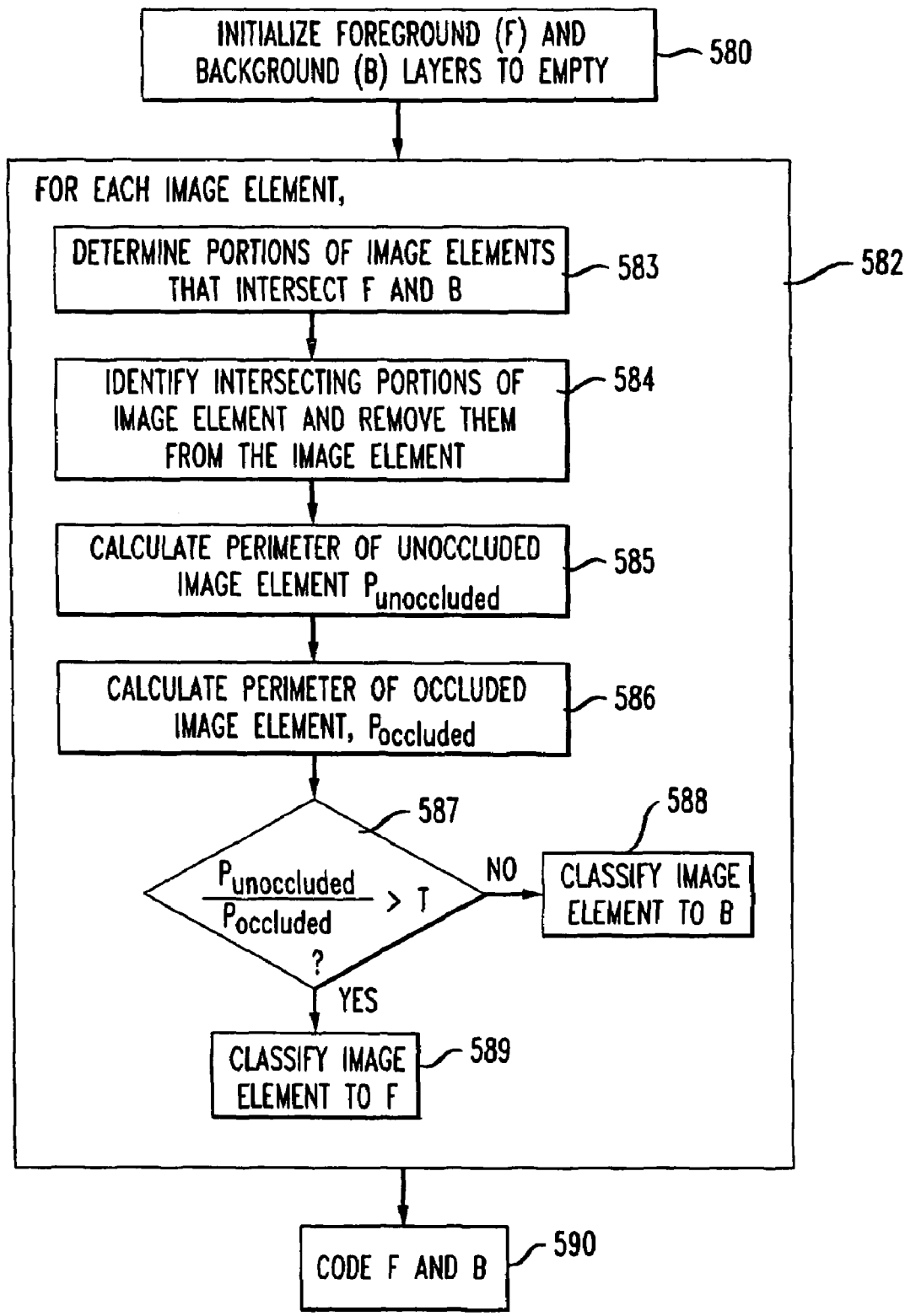
FIG. 8 is a flowchart of another embodiment of a method of the present invention.

FIG. 8 is a flowchart of a method according to another embodiment of the present invention. According to the invention, an image classification system initializes a foreground layer F and a background layer B to empty (580). Then, the system iteratively classifies each image element (582).

For each image element, the system performs the following. The system determines the portions of the image element that intersect with the foreground and background layers (583), then identifies the intersecting portions as occluded portions of the image element and removes them (584). The system then calculates an unoccluded perimeter of the image element, $P_{unoccluded}$, (585) and an occluded perimeter of the image element, $P_{occluded}$ (586). The system compares a ratio of these calculated perimeters to a predetermined threshold T (587), as in Equation (1). If the ratio of $P_{unoccluded}$ to $P_{occluded}$ exceeds the threshold, then the system classifies the image element as belonging to the foreground layer (589). Otherwise, the system classifies the image element as belonging to the background layer (588). An exemplary threshold T is 80%. Optionally, the system includes a color difference in the ratio, as in Equation (4).

After all the image elements are classified, the system then codes the foreground and background layers using their respective coding schemes (590).

Figure 9:
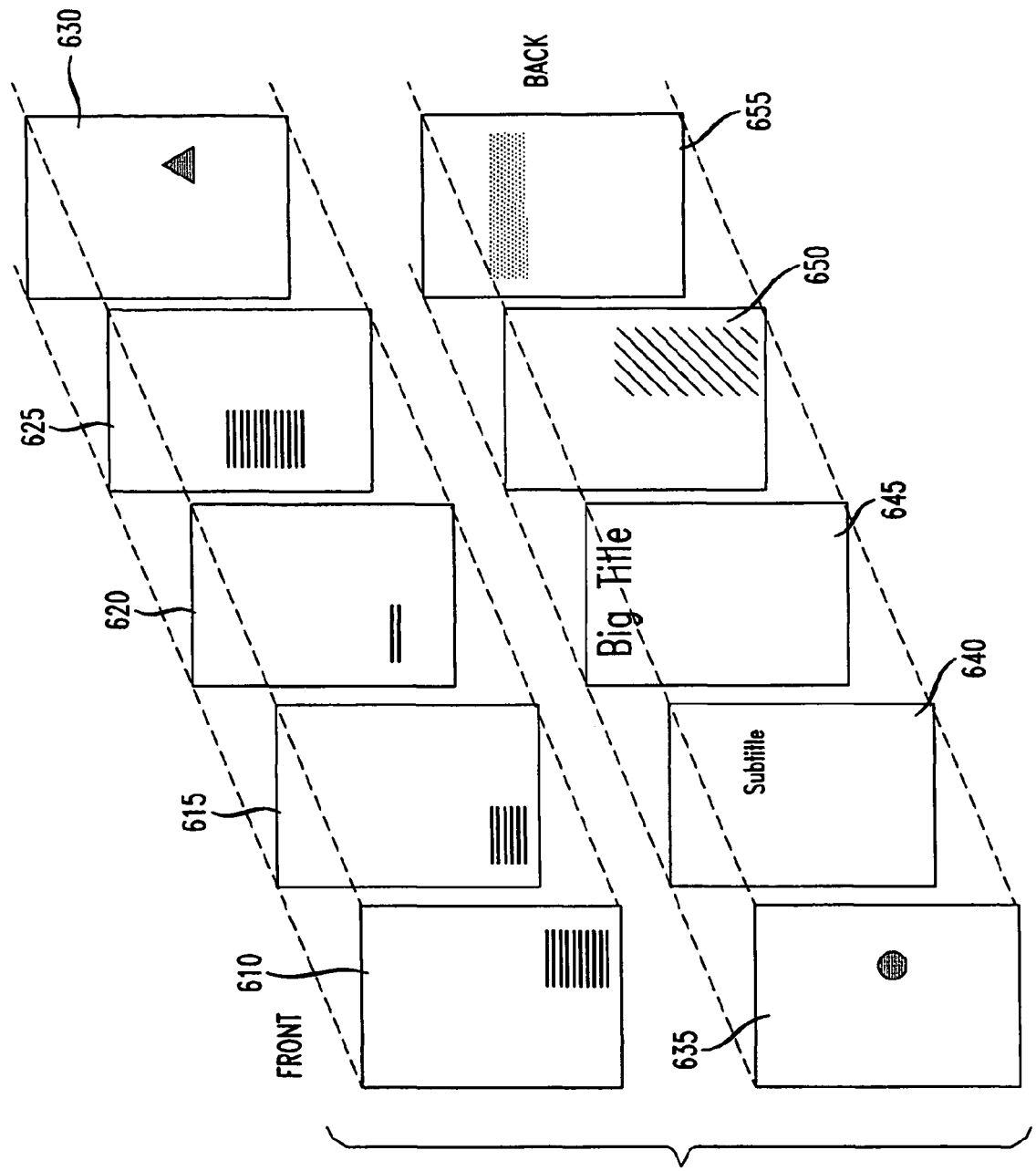
FIG. 9 illustrates an exemplary electronically produced image decomposed as a sequence of elementary image elements drawn on top of each other, upon which the methods of FIG. 1B or 8 may be applied.
Figure 9:
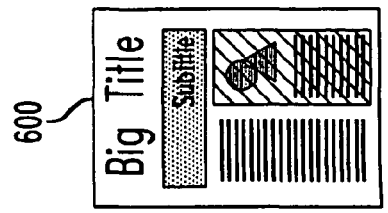

FIG. 9 shows an exemplary electronically produced image, which may be segmented according to the present invention. The system decomposes the image 600 into a sequence of elementary image elements 610 through 655 drawn on top of each other, where the front 610 and the back 655 of the sequence indicate the image elements that are topmost and bottommost in the sequence, respectively. That is, the system prints the front image element last and the back image element first. The system may print the elementary image elements 610 through 655 separately as illustrated in FIG. 9 using printing software that processes the given image format.

According to the present invention, the system first prepares empty foreground and background layers F and B representing the image elements to be classified as foreground and background. Then, the system processes the first element 610 according to the method of the present invention. That is, the system calculates the perimeter $P_{original}$ of the original shape of the first element using the perimeter calculation of FIG. 2, for example. Then, the system determines the portions of the first element shape that are occluded by background and foreground image elements drawn above the current image element as in FIG. 4, for example. Since the layers F and B are empty at this point, none of the first element is occluded and none of its portions are removed. So, the perimeter $P_{occlusion}$ of these non-existent occluded portions is nil.

Now, the system computes the perimeters $P_{occluded}$ and $P_{unoccluded}$ of the first element from Equations (2) and (3). Optionally, the system may calculate the color difference between the first element and the background according to either method of FIG. 7A or 7B, for example. Then, the system calculates the ratio of the occluded and unoccluded perimeters. Based on the ratio, the system classifies the first element as belonging to either the foreground or background layer, as shown in FIG. 1B, for example. Since the first element is unoccluded, the occluded and unoccluded perimeters are the same. Thus, the first element has a ratio of 1 or, with the color difference, higher. If the threshold is set at 80% (i.e., 0.8), then the first element is assigned to the foreground. The system then updates the foreground layer F to include the first element.

In the case of an occluded image element 650, which is occluded by elements 610, 615, 620, 630, and 635, the layers F and B may not be empty because elements 610 through 645 will have been processed and classified prior to element 650. Thus, the system determines and removes the occluded parts of the element 650. The occluded perimeter $P_{occluded}$ of the element 650 may be larger than the unoccluded perimeter $P_{unoccluded}$. As such, the ratio between the perimeters may be lower than the threshold. In which case, the system classifies the element 650 as background.

The system repeats the method of the present invention for the image elements 610 through 655, resulting in classified image elements, which the system then efficiently encodes.

The mechanisms and methods of the present invention may be implemented using a general-purpose microprocessor programmed according to the teachings of the present invention. The present invention thus also includes a machine-readable medium which includes instructions which can be executed by a processor to perform a method in accordance with the present invention. This medium can include, but is not limited to, any type of disk including floppy disk, optical disk, CD-ROMs, or any type of media suitable for storing electronic instructions.

Figure 10:
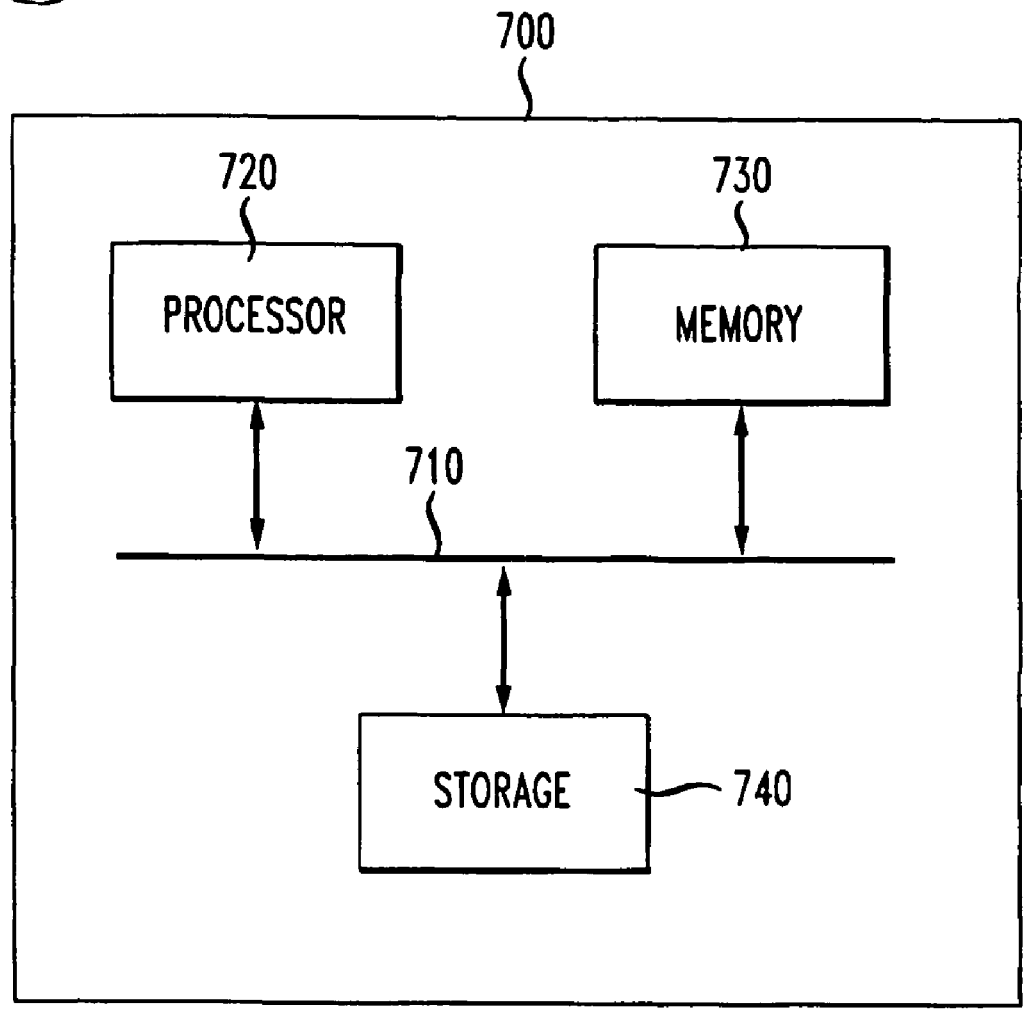
FIG. 10 is a block diagram of one embodiment of a computer system that can implement the present invention.

FIG. 10 is a block diagram of one embodiment of a computer system that can implement the present invention. The system 700 may include, but is not limited to, a bus 710 in communication with a processor 720, a system memory module 730, and a storage device 740 according to embodiments of the present invention.

It is to be understood that the structure of the software used to implement the invention may take any desired form. For example, the method illustrated may be implemented in a single program or multiple programs.

Numerous modifications and variations of the present invention are possible in light of the above teachings. It is therefore to be understood that within the scope of the appended claims, the invention may be practiced otherwise than as specifically described herein.

What is claimed is:

1. A method of processing image data, the method comprising:
   a processor performing the steps:
   assigning an image element to one of a plurality of categories based on a ratio between an unoccluded perimeter of the image element and an occluded perimeter of the image element; and
   processing the image element based on the assignment to one of the plurality of categories.

2. The method of claim 1, wherein processing the image element further comprises coding the image element according to a coding scheme associated with the one of the plurality of categories.

3. The method of claim 2, wherein the coding schemes associated with the plurality of categories are each image compression schemes, the compression scheme of the background layer realizing a coded output with a relatively higher compression ratio and image loss than the compression scheme of the foreground layer.

4. The method of claim 1, further comprising determining a shape of the image element.

5. The method of claim 4, wherein determining the shape of the image element further comprises removing occluded portions of the image element.

6. The method of claim 1, wherein the plurality of categories comprises a foreground layer and a background layer.

7. The method of claim 1, further comprising, prior to assigning the image element:
- determining portions of the image element that intersect with a foreground layer and a background layer;
- identifying the intersecting portions as occluded portions of the image element;
- removing the occluded portions to determine a shape of the image element; and
- calculating the unoccluded perimeter and the occluded perimeter of the image element.

8. The method of claim 1, wherein the unoccluded perimeter is calculated based on an original perimeter of the image element, the occluded perimeter and a perimeter of occluded portions of the image element.

9. The method of claim 1, wherein the occluded perimeter is calculated based on a sum of perimeters of each horizontal scan line of the image element and a sum of lengths of contact segments between each horizontal scan line and the next horizontal scan line of the image element.

10. The method of claim 1, wherein the ratio is based on a color difference between the image element and at least one adjacent image element, the unoccluded perimeter, and the occluded perimeter.

11. The method of claim 10, wherein the color difference is calculated to be the largest of color differences between the image element and the at least one adjacent image element.

12. The method of claim 10, wherein the color difference is calculated to be an average of color differences between a predetermined number of the at least one adjacent image element and the image element.

13. The method of claim 1, wherein the image element is classified as the one of the plurality of categories if the ratio exceeds a predetermined threshold.

14. A system for processing images, the system comprising:
- means for classifying the image element as one of a plurality of categories based on a ratio between an unoccluded perimeter of the image element and an occluded perimeter of the image element; and
- means for processing the image element based on the classification of the image element as the one of a plurality of categories.

15. The system of claim 14, further comprising means for generating an image element.

16. The system of claim 14, wherein the plurality of categories comprises a foreground layer and a background layer.

17. The system of claim 14, further comprising:
- means for coding the image element according to a coding scheme associated with the one of the plurality of categories.

18. A computer-readable medium containing program instructions for controlling a computing device to perform the step of classifying an image element as one of a plurality of categories based on a ratio between an unoccluded perimeter of the image element and an occluded perimeter of the image element.

19. The computer-readable medium of claim 18, wherein the program instructions further comprise coding the image element according to a coding scheme associated with one of the plurality of categories.

20. The computer-readable medium of claim 18, wherein the plurality of categories includes a foreground layer and a background layer.

21. The computer-readable medium of claim 20, wherein the coding schemes associated with the plurality of categories are each image compression schemes, the compression scheme of the background layer realizing a coded output with a relatively higher compression ratio and image loss than the compression scheme of the foreground layer.

22. The computer-readable medium of claim 18, wherein the ratio is based on a color difference between the image element and at least one adjacent image element, the unoccluded perimeter, and the occluded perimeter.

23. The computer-readable medium of claim 22, wherein the color difference is calculated to be a largest of color differences between the image element and the at least one adjacent image element.

24. The computer-readable medium of claim 23, wherein the color difference is calculated to be an average of color differences between a predetermined number of the at least one adjacent image element and the image element.

25. The computer-readable medium of claim 18, wherein the image element is classified as one of the plurality of categories if the ratio exceeds a predetermined threshold and, otherwise, to another of the plurality of categories.

\* \* \* \* \*